United States Patent

Hudspeth et al.

[15] 3,699,454

[45] Oct. 17, 1972

[54] DEGENERATE PARAMETRIC AMPLIFIER RECEIVER

[72] Inventors: Thomas Hudspeth, Malibu; Harold A. Rosen, Santa Monica, both of Calif.

[73] Assignee: Hughes Aircraft Company, Culver City, Calif.

[22] Filed: Jan. 30, 1970

[21] Appl. No.: 7,279

[52] U.S. Cl. ..................325/421, 307/88.3, 330/4.5, 325/485

[51] Int. Cl. ..............................................H03f 7/00

[58] Field of Search ............325/485, 421; 307/88.3; 323/69 R; 330/4.5, 7

[56] References Cited

UNITED STATES PATENTS

| | | | |
|---|---|---|---|
| 3,147,441 | 9/1964 | Adler | 325/485 |
| 3,293,556 | 12/1966 | Kotzebue et al. | 325/421 X |
| 3,353,099 | 11/1967 | Hayasi et al. | 325/485 X |

*Primary Examiner*—Benedict V. Safourek
*Attorney*—James K. Haskell and Don O. Dennison

[57] ABSTRACT

A high frequency receiving system for angle modulated signals is disclosed. A degenerate parametric amplifier is combined with unique circuitry and operated in a manner which provides low-noise amplification and detection of angle modulated signals. As in the case of other degenerate parametric amplifiers the pump frequency is maintained at exactly twice the signal frequency. However, the pump and signal are combined in such a way that substantial signal carrier cancellation occurs. A high speed phase locked loop maintains the proper pump frequency and phase relationship. A residual error signal derived from the phase locked loop comprises the receiver output.

4 Claims, 9 Drawing Figures

INVENTORS.
THOMAS HUDSPETH,
HAROLD A. ROSEN,
BY
[signature]
ATTORNEY.

DEGENERATE PARAMETRIC AMPLIFIER RECEIVER

FIELD OF THE INVENTION

This invention relates to receivers, and more specifically to low-noise receivers especially suitable for reception of angle modulated signals.

DESCRIPTION OF THE PRIOR ART

It is axiomatic that all receiving systems contribute noise to a received signal to a greater or lesser degree. In many applications the noise contribution of the receiver is relatively unimportant. However, in applications wherein the received signal is very weak to begin with any excess noise, whatever its source, is generally undesirable. The need for low-noise receivers is especially important in radar, radio astronomy, and communications applications where the signals are often extremely weak.

In the past, attempts to improve receiver performance have taken several tacks. One solution involves the use of very large antennas or antenna arrays having highly directional capabilities. Another method teaches the use of cryogenically cooled amplifiers in the receiver "front end" to improve their low-noise performance characteristics. Both of these techniques, however, are complex, costly, and in the case of large antenna arrays, extremely bulky. Thus, where cost and portability are important factors, these prior art techniques are generally unsatisfactory.

It is therefore a general object of the present invention to provide an improved relatively lightweight receiver for low-noise applications.

It is well-known that by utilizing radio frequency carriers that are frequency or phase modulated, the noise contribution of the signal path can be further reduced. These systems of modulation are generally termed angle modulation for the reason that the phase angle of the radio frequency carrier is constantly changing in accordance with the information being transmitted.

It is therefore another object of the present invention to provide a low-noise receiver capable of receiving angle modulated signals.

Both non-degenerate and degenerate parametric amplifiers are characterized by their low-noise operating characteristics. These amplifiers can be operated both with and without cryogenic cooling. As mentioned hereinabove, cooling adds to the expense and complexity of low-noise receivers and is to be avoided where simplicity and cost are important factors.

Because of the advantages enjoyed by degenerate parametric amplifiers, they have received wide attention in the art. Degenerate parametric amplifiers operate with a pump frequency which is exactly twice the signal frequency. Furthermore, the phasing between the signal and pump must be maintained precisely. Because of these two constraints, degenerate parametric amplifiers have not been considered practical for use with angle modulated signals, the frequency and phase of which generally varies very rapidly.

It is therefore another object of the present invention to provide a degenerate parametric amplifier-receiver capable of receiving angle modulated signals.

SUMMARY OF THE INVENTION

The above-mentioned features and objects of the present invention are accomplished by a degenerate parametric amplifier together with unique circuitry which operates in a manner different from prior art degenerate parametric amplifiers. In accordance with the teachings of the present invention, a high speed phase locked loop maintains the pump frequency at exactly twice the signal frequency. However, unlike other degenerate parametric amplifiers, the pump is phased with respect to the signal so that the two are in phase quadrature.

As the signal varies in frequency and phase according to its modulation content, there is generated an error signal which corresponds to momentary deviations between the desired phase quadrature relationship between the signal and pump. It is this error signal which causes the pump to change its frequency and phase in order to track the signal. However, since this error signal has a magnitude and sense which is proportional to the momentary changes in signal phase and frequency, a portion of it is extracted as the receiver output. Thus the receiver output comprises a modulated error signal having the same information content as the original angle modulated carrier.

It should be noted that the use of cryogenic cooling or high gain antennas are techniques which can be employed with the receiver of the present invention as well as receivers of the prior art. It is apparent that through the use of such techniques the low-noise performance of the present invention can be further improved even if at the expense of increased cost and complexity.

BRIEF DESCRIPTION OF THE DRAWINGS

In order that the invention may be clearly understood and readily carried into effect, it will now be described with reference by way of example to the accompanying drawings wherein like reference numerals have been utilized to designate like structural elements and in which:

FIG. 4 is a block diagram of a basic embodiment of the present invention;

DESCRIPTION OF THE PREFERRED EMBODIMENTS

Figure 1:
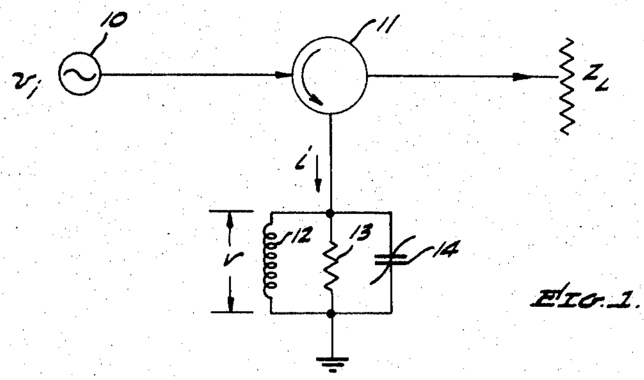
FIG. 1 is a simplified schematic diagram of a reflection type parametric amplifier.

Referring more specifically to the drawings, FIG. 1 is a simplified schematic diagram of a reflection-type parametric amplifier useful in the explanation of the present invention. In FIG. 1, a source 10 of input voltage $v_i$ is coupled to an input port of a three-port circulator 11. The second port of circulator 11 is coupled to a resonant circuit comprising the parallel combination of an inductor 12 having a value L, resistor 13 having a value R, and variable capacitor 14. The output arm of circulator 11 is coupled to a utilization device indicated generally by a matching load impedance $Z_L$.

It is assumed that the value of the capacitor 14 varies sinusoidally with respect to time as a result of a pumping stimulus. For example, the capacitance of a varactor diode can be made to vary sinusoidally over a given range by varying the magnitude of a reverse biasing voltage. The capacitance of capacitor 14 is therefore given by:

$$C(1+a\sin 2\omega t) \qquad (1)$$

where $c$ is the nominal capacitance at the bias point of the voltage-capacitance curve and $a$ is a measure of the capacitance variation produced by the pumping voltage. For the sake of clarity, the pumping and biasing sources are not shown in the simplified schematic diagram of FIG. 1.

For the case of a degenerate parametric amplifier the pumping frequency is exactly twice the signal frequency. Therefore, the signal is at frequency $\omega$, and the voltage $v$ across the resonant circuit is also at frequency $\omega$ and is given by:

$$v=\sin(\omega t+\theta) \qquad (2)$$

and therefore, $$(dv)/(d)=\omega\cos(\omega t+\theta) \qquad (3)$$

and $$\int v\,dt=\frac{-\cos(\omega t+\theta)}{\omega} \qquad (4)$$

The current $i$ flowing into the resonant circuit according to Kirchhoff's law is equal to the sum of the currents in the inductor 12, resistor 13 and capacitor 14:

$$i=i_C+i_R+i_L. \qquad (5)$$

However, since, $$i_C=v\frac{dC}{dt}+C\frac{dv}{dt}, \qquad (6)$$

and $$i_L=\frac{1}{L}\int v\,dt \qquad (7)$$

then $$i=(2\omega aC\cos 2\omega t)v+C(1+a\sin 2\omega t)\frac{dv}{dt}+\frac{1}{R}v+\frac{1}{L}\int v\,dt \qquad (8)$$

And since at resonance, $$Q+R/(\omega L)=R\omega C \qquad (9)$$

$$\omega^2LC=1 \qquad (10)$$

then $$i=\frac{1}{\omega L}\left[(1+a\sin 2\omega t)\frac{1}{\omega}\frac{dv}{dt}+\left(2a\cos 2\omega t+\frac{1}{Q}\right)v+\omega\int v\,dt\right] \qquad (11)$$

$$i=\frac{1}{\omega L}\left[(1+a\cdot\sin 2\omega t)\cos(\omega t+\theta)+\left(2a\cos 2\omega t+\frac{1}{Q}\right)\sin(\omega t+\theta)-\cos(\omega t+\theta)\right] \qquad (12)$$

Neglecting higher order harmonics this reduces to:

$$i=1/(\omega L)\,[\,(1/Q)\sin(\omega t+\theta)-(a/2)\sin(\omega t-\theta)\,] \qquad (3)$$

The admittance of the parallel resonant circuit is equal to $$Y=\frac{i}{v}=\frac{1}{R}\,\frac{\sin(\omega t+\theta)-\frac{aQ}{2}\sin(\omega t-\theta)}{\sin(\omega t+\theta)} \qquad (14)$$

or, in exponential terms, $$Y=\frac{1}{R}\left(1-\frac{aQ}{2}e^{-j2\theta}\right) \qquad (15)$$

Under the conditions given above, the parallel resonant circuit comprising inductor 12, resistor 13 and variable capacitor 14 is equivalent to the parallel combination of a fixed positive resistance $R$ and a negative resistance of $$\frac{2R}{aQ}e^{j2\theta}$$

Figure 2:
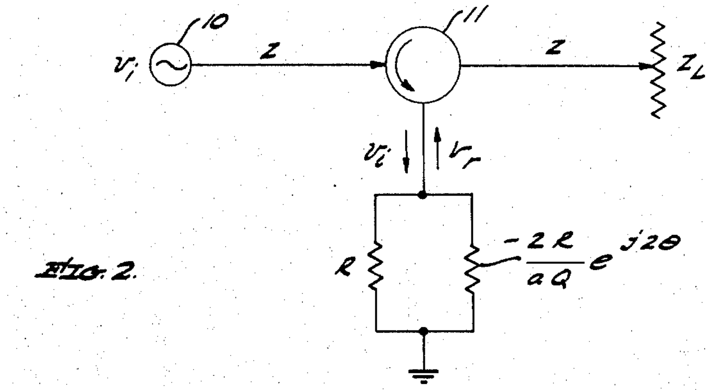
FIG. 2 is a simplified schematic diagram of the equivalent circuit for a degenerate parametric amplifier.

This equivalency is indicated in the schematic diagram of FIG. 2, which is a simplified drawing of the parametric amplifier for the degenerate case where the pumping frequency is at exactly twice the signal frequency. The characteristic impedances Z of the connecting transmission lines and circulator ports are matched and equal to $Z_L$.

From Equation (15) it is seen that a phase sensitive admittance function for the parametric amplifier is created by the pumping of the variable capacitance. This admittance function becomes negative for certain phases when the product of the fractional capacitance change $a$ due to the pumping action and the $Q$ of the resonant circuit is sufficiently large.

$$G=\frac{v_r}{v_i}=\frac{1-YZ}{1+YZ}=\frac{1+\frac{Z}{R}\left(\frac{aQ}{2}e^{-j2\theta}-1\right)}{1-\frac{Z}{R}\left(\frac{aQ}{2}e^{-j2\theta}-1\right)} \qquad (16)$$

$$G_1=\frac{1+\frac{Z}{R}\left(\frac{aQ}{2}-1\right)}{1-\frac{Z}{R}\left(\frac{aQ}{2}-1\right)} \qquad (17)$$

$$G_2=\frac{1-\frac{Z}{R}\left(\frac{aQ}{2}+1\right)}{1+\frac{Z}{R}\left(\frac{aQ}{2}+1\right)} \qquad (18)$$

Where:

and $$G_1 = \text{Gain for } \theta = 0 \quad (19)$$

$$G_2 = \text{Gain for } \theta = \pi/2 \quad (20)$$

From Equation (16) it is seen that the voltage gain $G$ of the degenerate parametric amplifier of FIG. 1 is also phase sensitive, and may be greater or less than unity. Equations (17) and (18) correspond to the voltage gains $G_1$ and $G_2$ for phase angles $\theta$ of zero and $\pi/2$, respectively. In other words, the zero phase angle gain, $G_1$, corresponds to the amplification factor of signals which are in phase with the half-pump phase angle and $G_2$ corresponds to the amplification factor of signals which are in phase quadrature with the half-pump phase angle. It is seen from Equation (16) that for all other phase relationships, the gain $G$, is complex and the output is phase-shifted with respect to the input.

Figure 3:
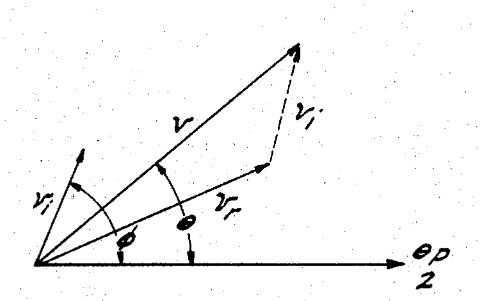
FIG. 3 is a vector diagram illustrating the operation of a degenerate parametric amplifier in accordance with the present invention.
Figure 2:
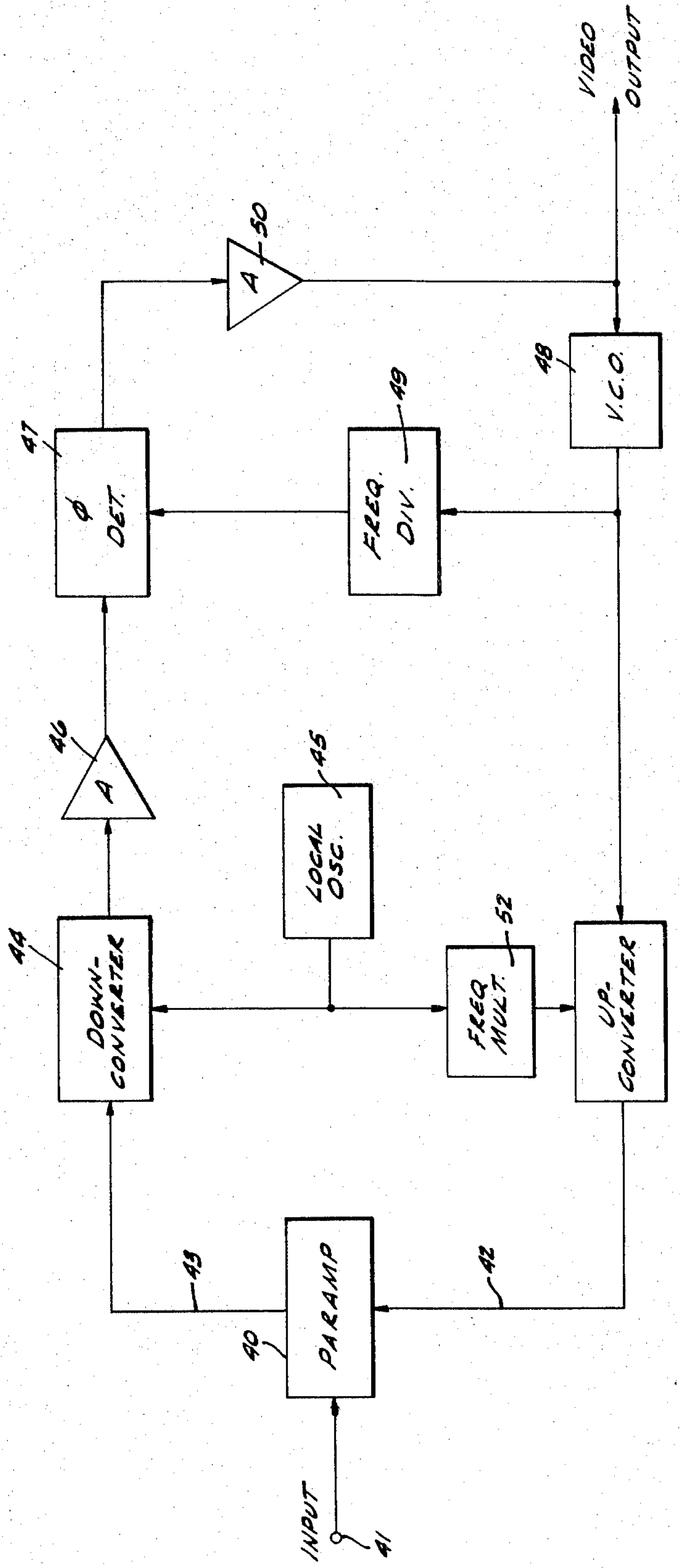

The nature of the complex gain and the phase relationship of the various voltages can be more readily seen from the vector diagram of FIG. 3. The input voltage $v_i$ from source 10 is defined as:

$$v_i = V_i \sin(\omega t + \phi) \quad (21)$$

The voltage, $v$, across the resonant circuit was defined in Equation (2) and is characterized by a phase angle $\theta$ with respect to the reference phase shown in FIG. 3 as $\theta_p/2$. The voltage $v$ is equal to the vector sum of the input voltage $v_i$ and the reflected, or output voltage $v_r$.

It can be shown that the gain G can also be written in terms of its in-phase and quadrature phase components such that:

$$G = v_r/V_i = G_1 \cos\phi + j\,G_2 \sin\phi = (G_1 + G_2)/(2)\, e^{j\varphi} + (G_1 - G_2)/(2)\, e^{-j\varphi} \quad (22)$$

This equation gives the real and imaginary components of the output voltage in terms of $G_1$ and $G_2$, and the input signal phase $\phi$. This complex function can be resolved into components at the input phase angle, $\phi$, and the negative of the input phase angle, $-\phi$. It is these two components which correspond to the commonly termed "signal" and "idler" outputs of prior art parametric amplifiers.

From Equation (22) it is also apparent that if the quadrature gain, $G_2$, is zero then the reflected voltage $v_r$ has no quadrature component for any input signal phase $\phi$, and the signal and idler components are equal.

Degenerate parametric amplifiers of prior art design are operated so that the phase $\phi$ of the unmodulated input signal is zero. This mode of operation follows naturally from Equation (22) since the gain $G$ is maximum with this phase relationship. Furthermore, it is seen that when so operated, the phase of the output voltage $v_r$ is nearly independent of the input signal and depends almost entirely on the pump phase. Thus, such prior art degenerate parametric amplifiers provide very little output variation with respect to phase variations of the input signal. And if $G_2$ is adjusted so that it is zero, then no output variation exists for phase tracking. Thus, where the information content of the input signal is in the form of frequency or phase modulation, tracking is either very poor or completely unavailable.

In keeping with the principles of the present invention, the parametric amplifier is operated so that the phase $\phi$ of the unmodulated input signal is in quadrature phase relation with the pump (i.e., $\phi = \pi/2$). From Equation (22) this results in a gain $G = jG_2$ and if $G_2$ is zero, this mode of operation results in a net gain of zero and an output voltage of zero. In other words, in accordance with the present invention, the input carrier is not amplified, but is suppressed. However, since the present invention is intended to extract the information content from a carrier signal and not to amplify the carrier itself, the carrier suppression feature is not undesirable. In fact, it is desirable, in that not only is the carrier suppressed, but so also are the noise components which are in phase with the input carrier.

In keeping with the principles of the present invention, it is found that the proper phase to be maintained between the input carrier wave and the half-pump phase is 90°. This causes the information sidebands which are in the form of angle modulation components to be amplified by the factor $G_1$. This operation results in the carrier being suppressed entirely when $G_2$ is adjusted to zero and the amplifier amplifies only the angle modulation sidebands corresponding to the phase excursions from $\phi$ corresponding to the information content of the signal and the phase-quadrature noise components.

According to the present invention, the information is extracted by amplifying the signal which represents the residual phase error between the desired phase quadrature relationship and the actual momentary deviations therefrom. The amplifying demodulating system which represents a preferred embodiment of the present invention is shown in the simplified block diagram of FIG. 4.

Figures 6, 7, 8:
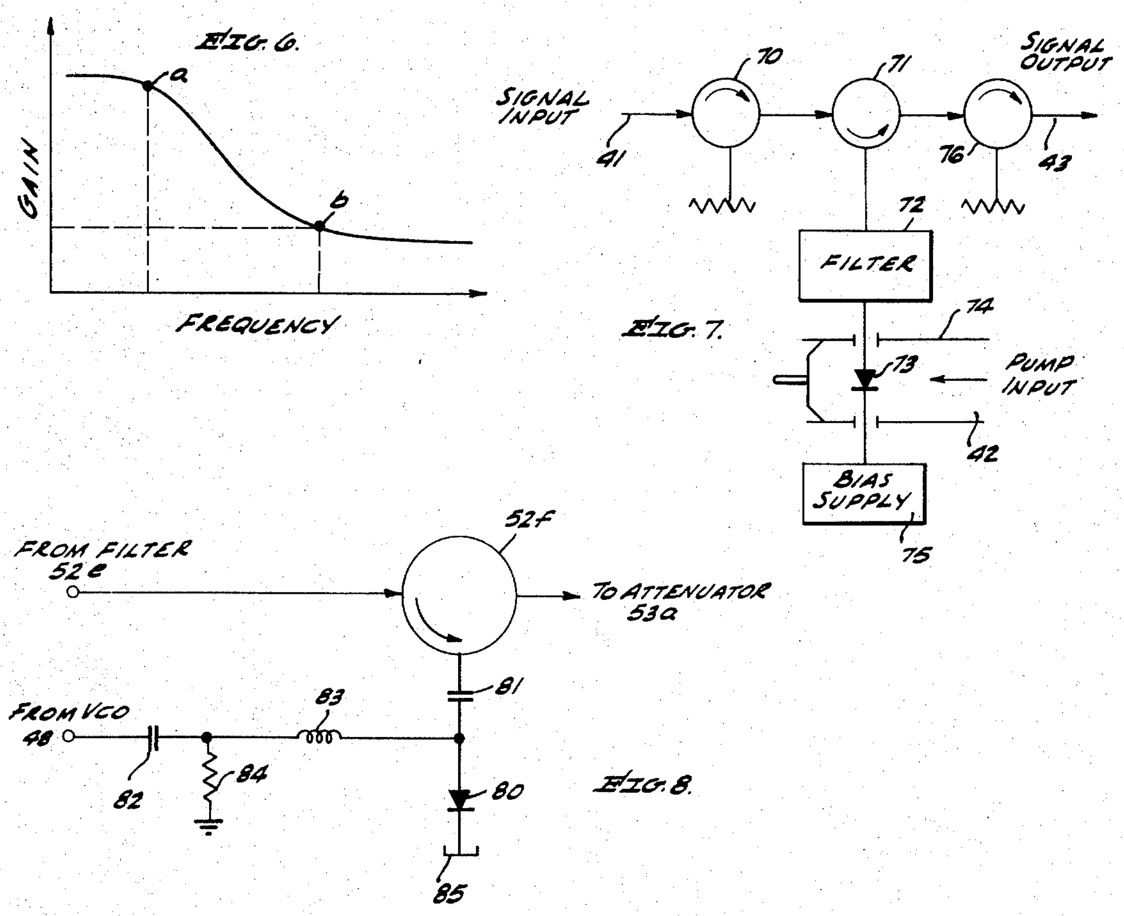
FIG. 6 is a graphical representation of the gain versus frequency characteristic of the control amplifier utilized in the embodiments of FIGS. 4 and 5.
FIG. 7 is a more detailed block diagram of a parametric amplifier structure suitable for use in the present invention.
FIG. 8 is a schematic diagram of an up-converter suitable for use in the present invention.

In FIG. 4 there is shown a simplified block diagram of a parametric amplifier receiver in accordance with the present invention. A parametric amplifier circuit 40, the details of which will be described in connection with FIG. 7, is provided with an input port 41 adapted to receive input signals from an antenna, for example, by means of an appropriate transmission line. The pumping signal to parametric amplifier 40 is applied by means of pump input port 42. The output port 43 of parametric amplifier 40 is coupled to a mixer or down-converter 44. The output of down-converter 44 is, in turn, coupled to a phase detector 47 by means of an intermediate frequency amplifier 46.

A second input to phase detector 47 is derived from a voltage controlled oscillator (v.c.o.) 48 coupled through a frequency divider circuit 49. The output of phase detector 47 is coupled to the input port of control amplifier 50, the output of which serves as an input to voltage controlled oscillator 48 and as the receiver video output. In addition to being coupled to frequency divider 49, the output of voltage controlled oscillator 48 is also coupled to an input of a high-level mixer or up-converter 51.

A local oscillator 45 provides a phase coherent source of wave energy for down-converter 44 and through frequency multiplier 52, for up-converter 51. The output of up-converter 51 comprises the paramp pump signal and is coupled to the pump input port 42 of parametric amplifier 40 to complete the circuit.

In operation, the microwave carrier which is angle modulated by the information being transmitted is coupled to input port 41 of parametric amplifier 40. As mentioned hereinabove, in accordance with the principles of the present invention, the signal carrier is suppressed at the parametric amplifier and only the angle modulated components centered about the carrier frequency are amplified. These modulation components are mixed at down-converter 44 with the local oscillator signal. As a result of this mixing an intermediate frequency signal is produced. The i.f. signal is then amplified by i.f. amplifier 46 and coupled to phase detector 47 where it is compared with the output signal from frequency divider 49.

Since the information-containing modulation components are generally varying rapidly in phase, an error signal is derived from the output of phase detector 47. This error signal is amplified and utilized in a dual capacity. First, it is used to control the frequency and phase of voltage controlled oscillator 48. Secondly, since the error signal varies in amplitude by an amount proportional to the phase variation of the input signal, the error signal is utilized as the video output of the receiver.

In the embodiment of FIG. 4, the output is simply extracted from a video output terminal although it is understood that one or more stages of video amplification can be incorporated in the receiver to increase the output signal level.

As mentioned, a portion of the output of voltage controlled oscillator 48 is coupled to phase detector 47 through frequency divider 49. The output of voltage controlled oscillator 48 is also coupled to the input upconverter 51 where it is mixed with a multiple of the local oscillator signal to furnish the pumping signal to parametric amplifier 40. As the phase of the input signal changes in accordance with its modulation content, the output frequency of voltage controlled oscillator 48 tracks at twice the rate. The up-converter therefore provides a pumping signal having a phase variation which tracks at twice the rate of the phase variations of the input signal, thereby maintaining the proper phase quadrature relationship between the pump and signal.

Figure 5:
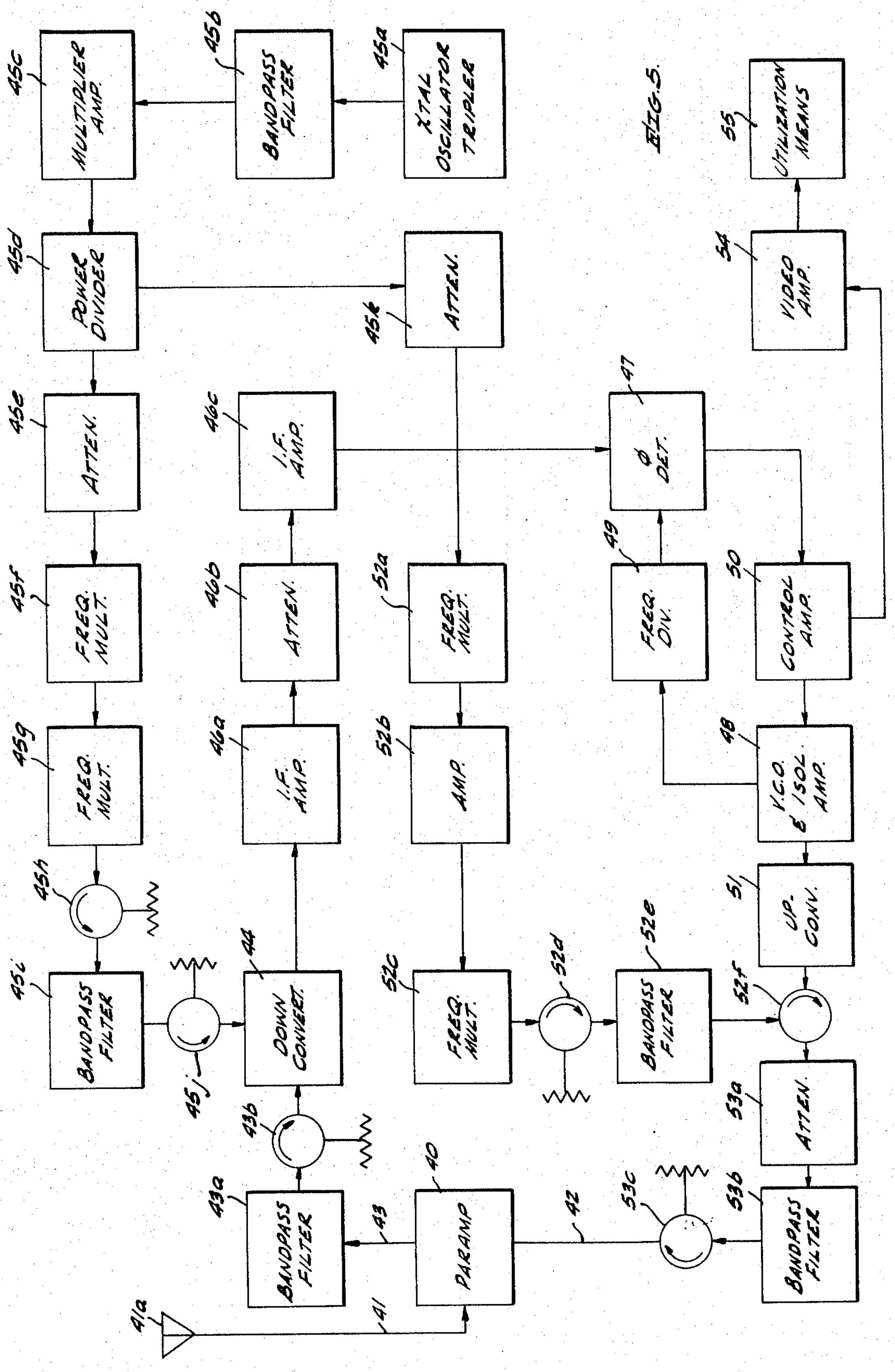
FIG. 5 is a more detailed block diagram of the embodiment of FIG. 4.

A more detailed block diagram of the preferred embodiment of FIG. 4 is shown in FIG. 5. Where appropriate, like reference numerals have been carried over from FIG. 4 to designate like structural elements. An antenna 41a of suitable design is coupled to the input port 41 of parametric amplifier 40. The output port 43 is coupled through a bandpass filter **43*a* and isolator 43*b* to one input of down-converter 44. Isolator 43**b, as well as the other isolators utilized in this embodiment can comprise, for example, a three port ferrite circulator having one port terminated in a reflectionless load impedance.

In the embodiment of FIG. 4, the local oscillator signal for down-converter 44 is indicated as being derived from a single local oscillator block 45. Because of the difficulty of obtaining very stable relatively high level signals at microwave frequencies a practical local oscillator source typically comprises a plurality of stages. The local oscillator portion of the illustrative embodiment of FIG. 5 comprises, in cascade, a combination crystal oscillator frequency-tripler **45*a*, a first bandpass filter 45*b*, a first frequency multiplier-amplifier 45*c*, a power divider 45*d*, an adjustable attenuator 45*e*, second and third frequency multiplier-amplifiers 45*f* and 45*g*, a first isolator 45*h*, a second bandpass filter 45*i* and a second isolator 45*j***. *The output of the multistage oscillator chain is coupled to the second or local oscillator input of down-converter 44. In order to insure synchronism between the local oscillator input to down-converter 44 and the input to up-converter 51, a submultiple of the local oscillator output frequency is extracted by means of power divider 45d* and processed as explained hereinbelow.

The output of down-converter 44 at the intermediate frequency is coupled through a first i.f. amplifier **46*a*, adjustable attenuator 46*b* and second i.f. amplifier 46*c* to a first input of phase detector 47. As in the case of the embodiment of FIG. 4, the second input to phase detector 47 is derived from voltage controlled oscillator 48 through frequency divider 49. As indicated in FIG. 5, voltage controlled oscillator 48 includes output amplifier for the purpose of isolation. The controls signal for voltage controlled oscillator 48 is, as before, derived from the output of phase detector 47 through control amplifier 50. The gain versus frequency characteristic of control amplifier 50 is designed such that the gain decreases with frequency over the band of operation as shown in FIG. 6. This response characteristic is necessary to prevent oscillation caused by regenerative feedback in the control loop consisting of phase detector 47, control amplifier 50, voltage controlled oscillator 48 and frequency divider 49**.

The output of control amplifier 50 is also coupled to the input of wideband video amplifier 54, the output port of which comprises the output of the receiver. The output of video amplifier 54 can then be coupled to utilization means 55 which can comprise, for example, the video portion of a conventional receiver or suitable signal distribution network.

The output of voltage controlled oscillator 48, in addition to driving frequency divider 49, is coupled to the input of up-converter 51. As mentioned hereinabove, a stage of amplification can be utilized in conjunction with voltage controlled oscillator 48 for isolation purposes. Up-converter 51 is indicated in FIG. 5 as being of the reflection type. A detailed schematic diagram of a suitable high level mixer is shown in FIG. 8, and is described in greater detail herein-below. High-level, high-frequency oscillation having a frequency equal to twice the signal frequency minus twice the nominal intermediate frequency is applied to the input-output port of up-converter 51 by means of circulator **52*f***.

The high frequency input to up-converter 51, as in the case of the embodiment of FIG. 4, is derived from the local oscillator chain. A portion of the multiplied output of oscillator-tripler **45*a* is obtained from power divider 45*d*. This signal is then processed through a level-set attenuator 45*k*, first frequency multiplier 52*a*, amplifier 52*b*, second frequency multiplier 52*c*, isolator 52*d* and bandpass filter 52*e*. The varying output of voltage controlled oscillator 48 is modulated onto the high level carrier and coupled to the input attenuator 53*a* by means of circulator 52*f***.

The modulated carrier thus generated is equal to twice the instantaneous frequency of the signal to parametric amplifier 40 and is maintained in phase quadrature as explained hereinabove. Thus, the output of up-converter 51 corresponds to the desired pump frequency. The pumping signal is merely coupled through attenuator **53*a*, narrow bandpass filter 53*b* and applied to the pump input port 42 of parametric amplifier 40 by means of isolator 53*c***.

In operation, angle modulated electromagnetic radiation at the signal frequency is received by antenna 41a and applied to parametric amplifier 40. The input signal containing the modulation component is amplified by parametric amplifier 40 and coupled to down-converter 44 where the signal is mixed with the signal from the local oscillator chain. The intermediate frequency output of down-converter 44 is coupled through the i.f. amplifiers to one input of phase detector 47. The control loop, including control amplifier 50, voltage controlled oscillator 48, and frequency divider 49, tends to maintain frequency and phase synchronism with the intermediate frequency signal. Since the frequency and phase of the intermediate frequency signal is varying rapidly in accordance with the modulation intelligence, the output of the phase detector likewise varies. It is this so-called residual error signal from the phase detector which constitutes the video output of the receiver. The residual error signal is amplified by control amplifier 50 and video amplifier 54, and is coupled to utilization means 55. If there is no angle modulation component present on the input carrier, there is no output from the receiver.

Since the output of voltage controlled oscillator 48 varies at twice the intermediate frequency and in synchronism therewith, it is merely modulated onto the high level pumping carrier to yield a pump frequency at exactly twice the signal frequency. The parametric amplifier receiver gain is adjusted by varying the magnitude of the pump signal by means of attenuator 53a.

In FIG. 6 there is shown a graphical representation of the gain versus frequency curve of the control amplifier 50 depicted in FIGS. 4 and 5. In a typical embodiment the upper point *a* on the knee of curve 60 corresponds to a voltage gain of approximately 60 at 2.0 MHz. From point *b* at the foot of curve 60 to the upper limit of the video frequency the response is substantially flat. The frequency response characteristic of control amplifier 50 is, of course, largely dependent upon design choice. It is necessary, however, that the gain be sufficiently low at frequencies at which the control loop phase delay equals $2\pi$ radians so that oscillation or ringing does not occur.

In FIG. 7 there is shown a more detailed block diagram of a parametric amplifier structure suitable for use in the present invention. Input to the parametric amplifier is provided at input port 41 which is coupled through a first isolator 70 to circulator 71. The signal is then coupled through a bandpass filter 72 to a variable-capacitance diode 73. Variable capacitance diode 73 is, in turn, mounted within a waveguiding structure 74. The electromagnetic energy at the pump frequency is applied to one end of waveguiding structure 74 by suitable coupling means, not shown. The other end of waveguiding structure 74 is provided with an adjustable shorting plunger as is well-known in the art. Biasing means 75 can be provided for diode 73 as shown.

Both the biasing voltage and the signal energy are coupled through the walls of waveguiding structure 74 by means of suitable insulating feed-through means. In the case of the biasing lead, such means can also include a bypass capacitance which prevents energy at radio frequencies from being coupled to bias supply 75. The reflected amplified signal energy is coupled by the return path through filter 72 to circulator 71. From circulator 71 the amplified signal is coupled through an output isolator 76 to output port 43 of the parametric amplifier.

Turning now to FIG. 8, there is shown schematically an up-converter suitable for use in practicing the embodiments of FIGS. 4 and 5. Circulator 52*f* is provided with an input port, output port and intermediate port for connection as shown in FIG. 5. The intermediate port of circulator 52f is coupled to a mixer diode 80 through a first blocking capacitor 81. Input signals from the voltage controlled oscillator are coupled to mixer diode 80 through a second blocking capacitor 82 and high frequency choke 83.

The mixer diode 80 can be of the microwave varactor type and is reverse biased by means of self biasing resistor 84. Diode 80 is mounted in series with a length of transmission line which is provided with an adjustable shorting member 85 for tuning purposes. It is understood that the up-converter shown schematically in FIG. 8 can be suitably integrated into a microwave structure such as a coaxial or strip transmission line structure as is well-known in the art. In any event, the two frequencies are combined by diode 80 to produce a pump signal having a frequency equal to twice the signal frequency. The pump signal is coupled out of the up-converter structure through circulator 52f and applied to the attenuator 53a shown in FIG. 5. Undesirable beat frequencies are rejected by narrow bandpass filter 53*b*, also shown in FIG. 5, before the pump signal is applied to the parametric amplifier.

Figure 9:
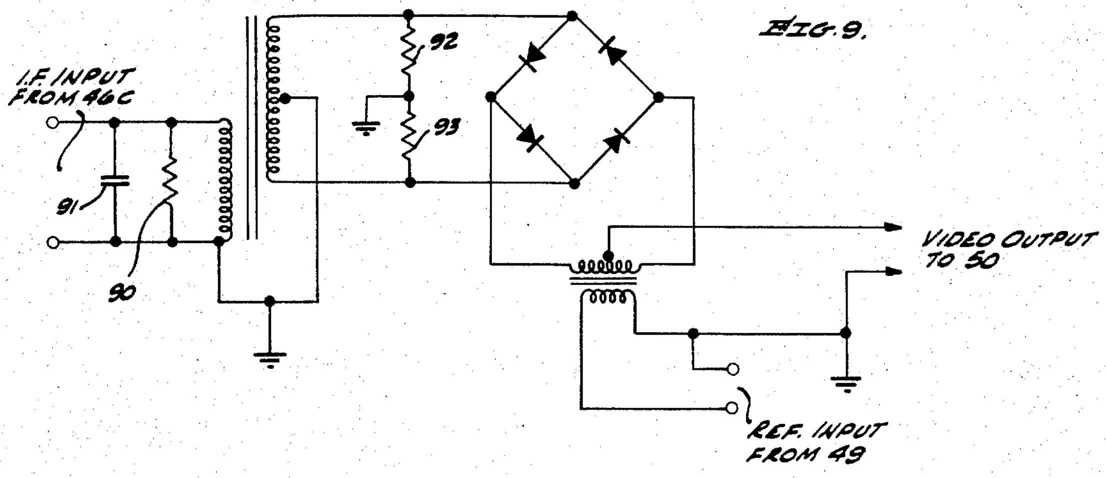
FIG. 9 is a schematic diagram of a phase detector suitable for use in practicing the embodiments of FIGS. 4 and 5.

In FIG. 9 there is shown in schematic diagram a phase detector circuit which can be utilized in practicing the present invention. The phase detector is of the double balanced mixer type such as that available from Hewlett-Packard Co., Models 10514A/B, 10534A/B/C. The i.f. input circuit is modified by the addition of resistor 90 and capacitor 91 for matching purposes. Resistors 92 and 93 are utilized for the purpose of improving isolation characteristics of the phase detector.

The circuit of FIG. 9 is characterized by a dc-coupled video output port which is adapted for coupling to the input of control amplifier 50 of FIG. 5. The phase detector output voltage is zero for reference and i.f. input signals of equal frequency and ± 90° relative phase and maximum for 0° and 180° relative phase.

In all cases it is understood that the above-described embodiments are merely illustrative of but a small number of the many possible specific embodiments which can represent applications of the principles of the present invention. Numerous and varied other circuit arrangements can be readily devised in accordance with these principles by those skilled in the art without departing from the spirit and scope of the invention.

What is claimed is:

1. A signal receiver comprising, in combination:
a source of angle modulated signals;
a degenerate parametric amplifier having a signal input, a pump input and a signal output;
means for applying said angle modulated signals to said signal input of said parametric amplifier;
a pump signal source;
a phase locked loop including said pump signal source coupled between said signal output and said pump input of said parametric amplifier, said phase locked loop including means adapted to maintain the frequency of said pump signal source at twice the frequency of said angle modulated signals and means for maintaining the phase of said pump signals in quadrature with the phase of said angle modulated signals; and means for deriving an amplitude modulated output signal from said phase locked loop.

2. The receiver according to claim 1, wherein said pump signal source comprises, in combination, a source of high frequency carrier wave energy and a controlled source of lower frequency wave energy and an up-converter for combining said carrier wave energy and said lower frequency wave energy to produce said pump signals.

3. A signal receiver adapted to receive signals having an instantaneous frequency which varies in accordance with its modulation content comprising, in combination:

a degenerate parametric amplifier having a signal input, a pump input and a signal output;

means for applying an input signal to said signal input of said parametric amplifier;

a pump signal generator;

a phase-locked loop including said pump signal generator coupled between said signal output and said pump input of said parametric amplifier, said phase-locked loop including means adapted to maintain the frequency of said pump signal generator at twice the instantaneous frequency of said input signal and means for maintaining the phase of the pump signal in quadrature with the phase of said input signal; and means for deriving an amplitude modulated output signal from said phase-locked loop.

4. The receiver according to claim 1 wherein said pump signal generator comprises, in combination, a source of high frequency carrier wave energy and a controlled source of lower frequency wave energy and an up-converter for combining said carrier wave energy and said lower frequency wave energy to produce said pump signals.

* * * * *